Aug. 22, 1950            G. D. OLSSON ET AL            2,519,695
CLUTCH AND BRAKE FOR SELECTORS FOR AUTOMATIC
TELECOMMUNICATION EQUIPMENT

Filed Aug. 11, 1947                                     2 Sheets—Sheet 1

Gunnar Daniel Olsson
Nils Fabian Björkman
Inventors

By Cushman, Darby & Cushman
Attys.

Patented Aug. 22, 1950

2,519,695

UNITED STATES PATENT OFFICE 2,519,695

CLUTCH AND BRAKE FOR SELECTOR FOR AUTOMATIC TELECOMMUNICATION EQUIPMENT

Gunnar Daniel Olsson and Nils Fabian Björkman, Stockholm, Sweden

Application August 11, 1947, Serial No. 767,942
In Sweden January 11, 1943

Section 1, Public Law 690, August 8, 1946
Patent expires January 11, 1963

5 Claims. (Cl. 192—18)

This invention relates to improvements of the driving clutch and brake device in a selector for telecommunication equipments, such as telephone, telegraph or signal equipments.

One object of the invention is to provide a driving clutch and brake device in selectors for telecommunication, the function of which is highly independent of deformations of the impulses used, for instance on account of long lines causing a delay due to the great capacity or bad dials.

Another object is to provide a driving clutch and brake device in selectors for telecommunication, which in spite of great simplicity in construction renders a very quick and, nevertheless, safe selection, numerical as well as unnumerical, possible.

Other objects, advantages and meritorious features of our invention will more fully appear from the following description, appended claims and accompanying drawings, wherein:

Figure 2:
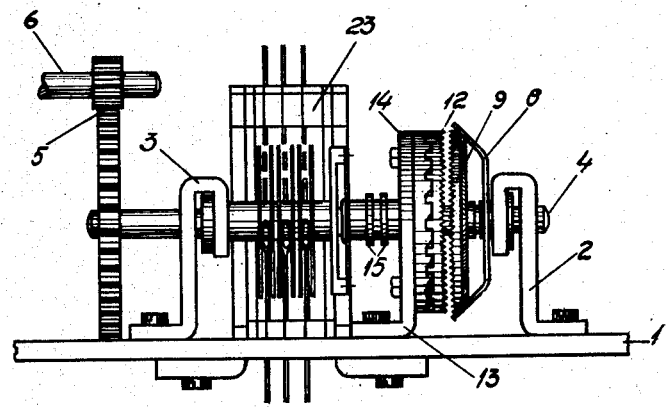
Figures 1 and 2 are a side view and a top view, respectively, of our improved selector.
Figure 1:
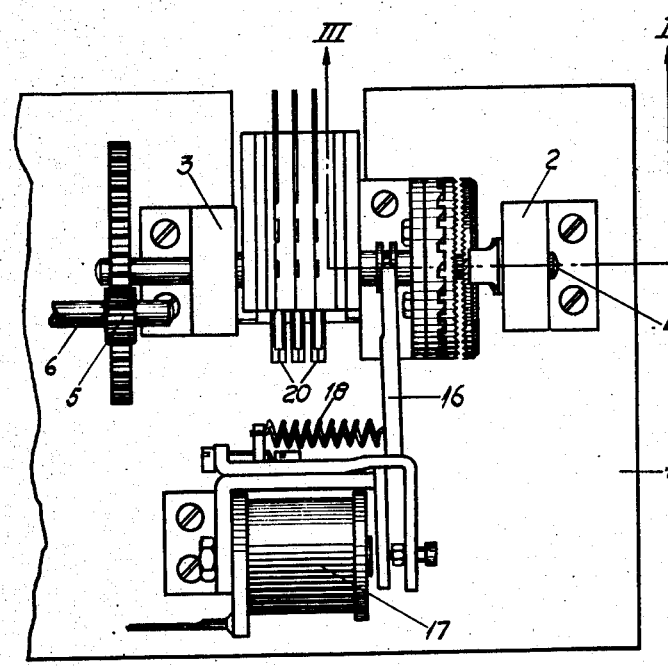
Figure 3:
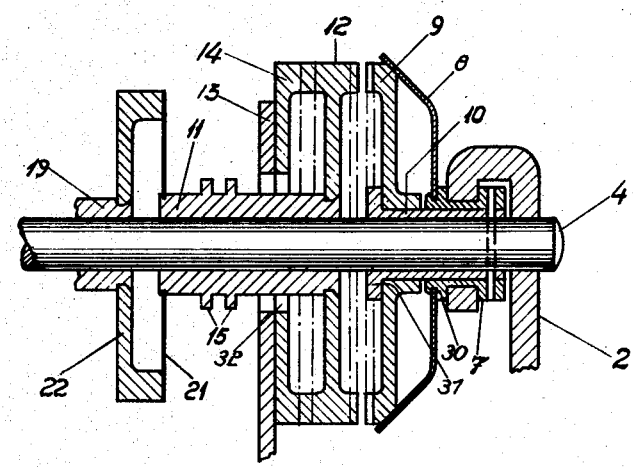
Fig. 3 is a cross-sectional view taken on the line III—III of Fig. 1.
Figure 4:
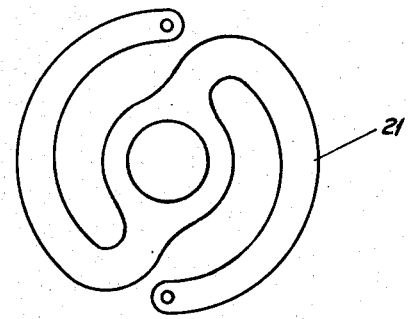
Fig. 4 illustrates a structural element.

In the drawing 1 designates a bottom plate to which two angular supports 2 and 3 are attached, which supports are formed as bearings for a shaft 4. Said shaft is through a gear 5 connected with a drive shaft that, preferably, is common to several selectors. The shaft 4 is fixed in longitudinal direction by the downwardly bent end of the support 2 which end extends in a slot provided in a bushing 7 firmly attached to the shaft 4. In another slot 30 there is firmly arranged a leaf spring 8 that bears at its outer ends against a drive wheel 9 in the form of a crown wheel and holds said wheel pressed against a flange 37 provided on a sleeve 10 which is firmly attached to the shaft 4 and about which the crown wheel 9 is rotatably arranged. The leaf spring 8 has such a tension that the drive wheel normally is rotated by the shaft 4. The form of the details will be best seen in Fig. 3. About the shaft 4 there is further provided a sleeve 11 that is movable freely on the shaft and is at one end firmly connected with a coupling wheel 12 formed as a double crown wheel. The bushing 11 extends through a central aperture 32 of a stop wheel 12 which is likewise formed as a crown wheel. The bushing 11 is also provided with two flanges 15 between which a fork 16 operates. Said fork is attached to the armature of a clutch magnet 17 and is normally held in returned position by a return spring 18. The clutch magnet 17 is omitted in Fig. 2 so that this figure better illustrates details located behind the magnet. The shaft 4 carries further a sleeve 19 turnable relatively to said shaft and having mounted thereon three contact brushes 20. The position of said sleeve is fixed in longitudinal direction by the downwardly bent end of the angular support 3 which end extends into a slot in the sleeve 19 and which may be similar in construction to the bushing 7 and the angular support 2. The sleeves 11 and 19 are connected by means of a spring coupling comprising a leaf spring 21 preferably of the form shown in Fig. 4 and attached to the sleeve 11 at its centre. The ends of the spring 21 are attached to an arm 22 mounted on the sleeve 19. Thus, the spring 21 admits a displacement of the sleeve 11 in the direction of the shaft 4 though said sleeve 11 is non-rotatably connected with the sleeve 19 which latter is unmovable in the direction of the shaft 4. The contact brushes cooperate in a manner known per se with a contact bank 23 of a nature usually employed in such rotary switches.

The form of the teeth on the crown wheels 9, 12 and 14 and the adjustment of the position of the latter relatively to each other are of great importance for the operation of the selector. Fragments of the crown wheels are shown diagrammatically on an enlarged scale in Fig. 5.

Figure 5:
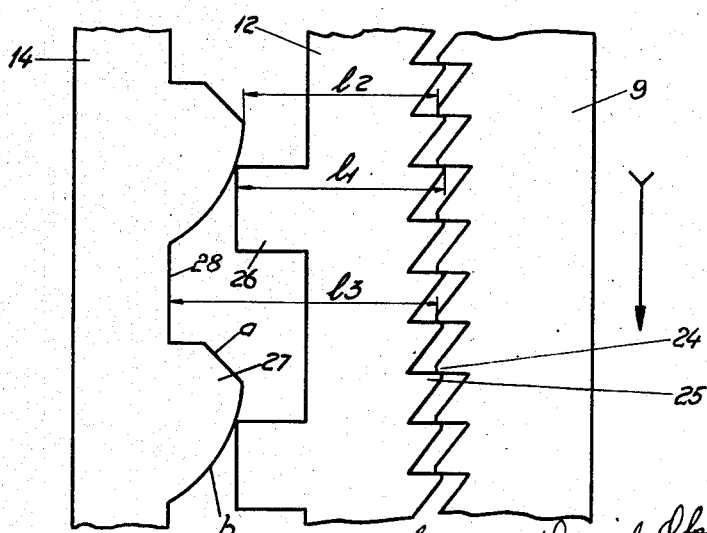
Fig. 5 illustrates diagrammatically the shape of three cooperating wheels of the selector.

As will be seen of Figure 5 the drive wheel 9 and the coupling wheel 12 are provided with teeth 24 and 25 respectively the profile of which have the form of right triangles, one of the smaller sides of said triangles constituting the base of the tooth and the other smaller side being the edge of the surface subjected to the load. The coupling wheel is on its other side provided with teeth 26 having a rectangular profile and cooperating with teeth 27 on the fixed stop wheel 14. The teeth 27 comprise on one hand a sloping $a$, on the other hand a curved surface $b$ the curvature of which substantially conforms to the path of movement of the teeth 26 determined by the speed of rotation and the acceleration in the direction of the shaft 4 of the coupling wheel 12 when the latter is coupled with the stop wheel 14. Further the distance between said stop wheel, and the drive wheel 9 is so chosen that the coupling wheel 12 may only be disconnected from the drive wheel 9 when the teeth 26 face the clearings 28 between the teeth 28 or are so close up to these clearings that on the one hand by the momentum of the coupling wheel 12 and on the other hand by the force acting in the direction of the shaft 4 on said wheel the teeth 26 are urged into complete engagement with the clearings between the teeth 27 by sliding of the teeth 26 along the curved surfaces b of the teeth 27. This is attained due to the fact that the distance $l_1$ exceeds the distance $l_2$ by nearly the height of the teeth 24 but is smaller than the distance $l_3$ by more than said height.

In the operation of the selector the starting is accomplished by switching in the magnet 17. Then the coupling wheel 12 is coupled with the continuously rotating drive wheel 9 by means of the fork 16. As said hereinbefore the coupling wheel 12 is not disconnected from the stop wheel 14 in the moment when the teeth 24 and 25 touch each other, the teeth 27 being provided with slopings a along which the teeth 26 may slide during that portion of the longitudinal movement of the coupling wheel when the teeth 24 and 25 are engaged. It may, however, occur that the tops of the teeth 25 will abut against the tops of the teeth 24. To prevent the selector under unfavorable circumstances by this reason from being stopped or the teeth from being deformed the drive wheel 9 is longitudinally displaceable so that when the teeth 26 rose along the slopings a said wheel 9 is displaced in the direction of coupling, said displacement being counteracted by the leaf spring 8. The latter also serves as a friction coupling for the drive wheel 9 so as to admit the latter to slide relatively to the shaft 4 when said wheel is stopped.

Just before the selector arms 20 reach the coupling position the coupling magnet 17 is demagnetized. The return spring 18 then tries to bring the coupling wheel back to the initial position. However, this is prevented by the abutment of the teeth 26 of the coupling wheel 12 against the teeth 27 of the stop wheel 14. Thus, the coupling wheel 12 will be held in engagement with the drive wheel 9 and is not disconnected before the teeth 26 have moved such a distance to the left (Figure 5) along the curved surfaces b that the coupling wheel 12 certain continues to the intended position where it is stopped. To each position in which the coupling wheel 12 completely gears into the stop wheel 14 there is a corresponding operative position of the contact brushes 20. As will be seen the disconnection of the selector magnet may be varied within a relatively long period without the desired adjustment of the selector being risked. Further, a very great speed of rotation of the contact brushes 20 may be allowed as they are stopped very rapidly.

In the embodiment described hereinbefore the coupling wheel 12 of the selector and the selector arms 20 are shown as rigidly connected with each other in tangential direction. However, it is also possible to have an intermediate gearing having a suitable gear ratio. This will be especially advantageous in such cases when the selector comprises a great number of stages of selection. In this way the number of stop teeth of the coupling wheel 12 is reduced so that the wheel itself may be made smaller and/or its pitch of teeth greater.

The selector must not necessarily be of the rotary switch type. The invention may be carried into effect even by other types of selectors (selectors with leaf spring contacts being actuated by means of cam plates or the like, selectors having straight moving contact brushes and so on). It is only necessary to adapt the coupling and stop device to the selector construction in question without departing from the principle of the invention. It will often be sufficient to introduce a suitable gearing between the coupling member and the selector arms.

Further, it is not necessary that the drive, coupling and stop members are coaxially arranged. They may also be arranged in other ways so as to suit the construction of the selector in question.

From the foregoing, it will be understood that numerous changes in construction and arrangement of the parts might be resorted to without departing from the spirit of the invention as defined by the claims.

What we claim is:

1. In a selector for telecommunication equipments, a continuously rotatable driving member, a fixed stop-member and a movable member to be brought into engagement alternately with said driving-member and said stop-member, said movable member having a number of teeth cooperating with a number of recesses provided in said stop-member, which teeth and the portions between said recesses are constructed and arranged to hold said movable member, when it is operated for moving towards said stop-member, in engagement with said driving member if said teeth and recesses do not face each other, but to permit disconnecting of said movable member from said driving member and to center said movable member when it substantially reaches a position of engagement with said stop-member.

2. In a selector for telecommunication equipments, a continuously rotatable driving crown wheel, a fixed crown wheel and a double crown wheel to be displaced between said driving crown wheel and said fixed crown wheel, said crown wheels being coaxially arranged, said double crown wheel and said driving crown wheel having clutch teeth cooperating with each other, whereas said double crown wheel and said fixed crown wheel are provided with stop teeth cooperating with each other, the distance between said clutch teeth and said stop teeth on said double crown wheel exceeding the distance between the tops of the stop teeth of said fixed crown wheel and the tops of the clutch teeth of said driving crown wheel by a less distance than the height of said clutch teeth, the first said distance on the other hand being smaller than the distance between the bottom of the clearings between the stop teeth of said fixed wheel and the tops of the clutch teeth of said driving crown wheel by more than said height.

3. In a selector for telecommunication equipments, a continuously rotatable driving crown wheel, a fixed crown wheel and a double crown wheel to be displaced between said driving crown wheel and said fixed crown wheel, said crown wheels being coaxially arranged, said double crown wheel and said driving crown wheel having clutch teeth cooperating with each other, whereas said double crown wheel and said fixed crown wheel are provided with stop teeth cooperating with each other, the stop teeth of said double crown wheel having a substantially rectangular profile, whereas the stop teeth of said fixed crown wheel are formed, seen in the direction of rotation of said double crown wheel, with a sloping and a curved surface, the curvature of said surface substantially corresponding to the moving path of the stop teeth of said double crown wheel when the latter is moving for engagement with said fixed wheel.

4. In a selector for telecommunication equipments, a continuously rotatable driving crown wheel, a fixed crown wheel and a double crown wheel to be displaced between said driving crown wheel and said fixed crown wheel, said crown wheels being coaxially arranged, said double crown wheel and said driving crown wheel having clutch teeth cooperating with each other, whereas said double crown wheel and said fixed crown wheel are provided with stop teeth cooperating with each other, the stop teeth of said double crown wheel having a substantially rectangular profile, whereas the stop teeth of said fixed crown wheel are formed, seen in the direction of rotation of said double crown wheel, with a sloping and a curved surface, the curvature of said surface substantially corresponding to the moving path of the stop teeth of said double crown wheel when the latter is moving for engagement with said fixed wheel, whereas the profile of said clutch teeth has the form of a right triangle, one of the smaller sides of said triangle being the base of a clutch tooth and the other smaller side being the edge of the surface subjected to the load by a cooperating tooth.

5. In a selector for telecommunication equipments, a continuously rotatable driving crown wheel, a fixed crown wheel, a double crown wheel to be displaced between said driving crown wheel and said fixed crown wheel, said crown wheels being coaxially arranged, said driving crown wheel being mounted on a continuously rotatable driving shaft in such a manner that it is displaceable in longitudinal direction and rotatable on said shaft, a bushing on said shaft, a flange on said bushing, and a spring operating substantially in the direction of said shaft and pressing said driving crown wheel against said flange, said double crown wheel and said driving crown wheel having clutch teeth cooperating with each other, whereas said double crown wheel and said fixed crown wheel are provided with stop teeth cooperating with each other, the distance between said clutch teeth and said stop teeth on said double crown wheel exceeding the distance between the tops of the stop teeth of said fixed crown wheel and the tops of the clutch teeth of said driving crown wheel by a less distance than the height of said clutch teeth, the first said distance on the other hand being smaller than the distance between the bottom of the clearings between the stop teeth of said fixed wheel and the tops of the clutch teeth of said driving crown wheel by more than said height.

GUNNAR DANIEL OLSSON.
NILS FABIAN BJÖRKMAN.

REFERENCES CITED

The following references are of record in the file of this patent:

UNITED STATES PATENTS

| Number | Name | Date |
|---|---|---|
| 1,255,143 | Ebeling | Feb. 15, 1918 |
| 1,279,893 | McQuarrie | Sept. 24, 1918 |
| 1,531,134 | Richard | Mar. 24, 1925 |
| 1,725,044 | Aldendorff | Aug. 20, 1929 |